US007493149B1

(12) United States Patent
Doyle et al.

(10) Patent No.: US 7,493,149 B1
(45) Date of Patent: Feb. 17, 2009

(54) METHOD AND SYSTEM FOR MINIMIZING POWER CONSUMPTION IN MOBILE DEVICES USING COOPERATIVE ADAPTIVE VOLTAGE AND THRESHOLD SCALING

(75) Inventors: James T. Doyle, Nederland, CO (US); Dragan Maksimovic, Boulder, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 1405 days.

(21) Appl. No.: 10/106,428

(22) Filed: Mar. 26, 2002

(51) Int. Cl.
*H04M 1/73* (2006.01)
(52) U.S. Cl. .................... 455/574; 455/572; 455/550.1; 455/127.1; 455/343.5; 713/320; 713/322; 326/31; 326/33; 327/535
(58) Field of Classification Search .......... 455/574, 455/420, 425, 343.1–343.6, 127.1–127.5, 455/550.1; 713/320, 322, 330, 340; 326/31, 326/33; 323/350, 351, 314–315, 312–313; 327/534–536, 537, 530, 544
See application file for complete search history.

(56) References Cited

U.S. PATENT DOCUMENTS

| 6,064,250 | A | * | 5/2000 | Proebsting | 327/536 |
| 6,147,508 | A | * | 11/2000 | Beck et al. | 326/32 |
| 6,163,721 | A | * | 12/2000 | Thompson | 607/2 |
| 6,166,577 | A | * | 12/2000 | Mizuno et al. | 327/278 |
| 6,175,251 | B1 | * | 1/2001 | Horiguchi et al. | 326/83 |
| 6,313,622 | B1 | * | 11/2001 | Seki et al. | 324/76.82 |
| 6,411,913 | B1 | * | 6/2002 | Beckwith | 702/65 |
| 6,775,531 | B1 | * | 8/2004 | Kaewell et al. | 455/343.1 |

* cited by examiner

*Primary Examiner*—George Eng
*Assistant Examiner*—Marcos L Torres

(57) ABSTRACT

A method for minimizing power consumption in a mobile device using cooperative adaptive voltage and threshold scaling is provided that includes receiving a supply voltage, a PMOS back bias voltage, and an NMOS back bias voltage. A clock signal is received. The clock signal is propagated through a timing comparison circuit. An output of the timing comparison circuit is examined. A determination is made regarding whether to request more power based on the output of the timing comparison circuit. A voltage control signal is sent to request more power when a determination is made to request more power based on the output of the timing comparison circuit.

18 Claims, 9 Drawing Sheets

METHOD AND SYSTEM FOR MINIMIZING POWER CONSUMPTION IN MOBILE DEVICES USING COOPERATIVE ADAPTIVE VOLTAGE AND THRESHOLD SCALING

TECHNICAL FIELD OF THE INVENTION

The present invention relates generally to power regulation for integrated circuits and, more particularly, to a method and system for minimizing power consumption in mobile devices using cooperative adaptive voltage and threshold scaling.

BACKGROUND OF THE INVENTION

Business and consumers use a wide array of wireless devices, including cell phones, wireless local area network (LAN) cards, global positioning system (GPS) devices, electronic organizers equipped with wireless modems, and the like. The increased demand for wireless communication, and other mobile, devices has created a corresponding demand for technical improvements to such devices. Generally speaking, more and more of the components of conventional radio receivers and transmitters are being fabricated in a single integrated circuit package.

One important aspect of wireless communication devices having integrated circuits is battery life. In order to maximize battery life for these wireless communication devices, much emphasis has been placed on minimizing power consumption in the integrated circuits of the wireless communication devices.

Conventional approaches to minimizing power consumption in integrated circuits include voltage scaling. Voltage scaling is useful for minimizing dynamic power consumption due to switching. However, voltage scaling does not provide much, if any, benefit for static power consumption due to leakage current. This causes problems in digital technologies that have been scaled to be smaller and smaller, resulting in more leaky circuits. In fact, the leakage current, which used to be a relatively small component of total power consumption, is actually dominating total power consumption for many deep submicron digital chips. A digital chip with several million transistors, for example, may have a DC leakage current of several milliamps, or even tens of milliamps, when the chip is in a standby mode. In typical mobile devices, this amount of leakage current, and its corresponding power consumption, is unacceptable.

Conventional approaches to minimizing power consumption in integrated circuits also include threshold scaling. Threshold scaling is useful for minimizing static power consumption due to leakage current. However, threshold scaling does not provide much, if any, benefit for dynamic power consumption due to switching.

Thus, in order to make use of both voltage scaling to minimize dynamic power consumption and threshold scaling to minimize static power consumption, one approach has been to incorporate switching software into the chip. This switching software determines the voltage and threshold needed to operate a particular task and switches the chip into a corresponding mode while that task is being performed. One drawback to this approach includes the use of a safety margin in the calculation of critical path delays when selecting the mode, which results in the chip possibly not operating at its optimum potential.

SUMMARY OF THE INVENTION

In accordance with the present invention, a method and system for minimizing power consumption in mobile devices using cooperative adaptive voltage and threshold scaling are provided that substantially eliminate or reduce disadvantages and problems associated with conventional systems and methods. In particular, cooperative adaptive voltage and threshold scaling is used to minimize average power consumption over all operating modes, thereby maximizing battery life for the mobile device.

According to one embodiment of the present invention, a method for minimizing power consumption in a mobile device using cooperative adaptive voltage and threshold scaling voltage is provided. The method includes receiving a supply voltage, a PMOS back bias voltage, and an NMOS back bias voltage. A clock signal is received. The clock signal is propagated through a timing comparison circuit. An output of the timing comparison circuit is examined. A determination is made regarding whether to request more power based on the output of the timing comparison circuit. A voltage control signal is sent to request more power when a determination is made to request more power based on the output of the timing comparison circuit.

According to another embodiment of the present invention, a method for minimizing power consumption in a mobile device using cooperative adaptive voltage and threshold scaling voltage is provided. The method includes receiving a voltage control signal based on a clock frequency for the mobile device. A reference signal is received. A supply voltage, a PMOS back bias voltage, and an NMOS back bias voltage are determined based on the voltage control signal and the reference signal. The supply voltage, the PMOS back bias voltage, and the NMOS back bias voltage for the mobile device are generated.

According to yet another embodiment of the present invention, a system for minimizing power consumption in a mobile device using cooperative adaptive voltage and threshold scaling is provided that includes a plurality of delay cells, a register and a decoder. The delay cells comprise at least an initial delay cell, a first designated delay cell, and a second designated delay cell. Each delay cell is operable to receive an input signal at an input terminal, to generate an output signal based on the input signal at an output terminal, and to provide the output signal to the input terminal of a subsequent delay cell. The initial delay cell is operable to receive a clock signal at the input terminal. The register is coupled to the first and second designated delay cells. The register is operable to receive the output signals from the output terminals of the first and second designated delay cells and to generate a first status signal based on the output signal from the first designated delay cell and a second status signal based on the output signal from the second designated delay cell. The decoder is coupled to the register. The decoder is operable to receive the first and second status signals and to generate a first power control signal based on the first status signal and a second power control signal based on the second status signal. The first and second power control signals are operable to request power adjustments for the mobile device.

Technical advantages of one or more embodiments of the present invention include providing an improved method for minimizing power consumption in mobile devices. In a particular embodiment, adaptive voltage scaling and adaptive threshold scaling are used cooperatively based on a clock frequency for the corresponding chip as measured on the chip. As a result, adaptive voltage scaling may be used to minimize dynamic power consumption at higher frequencies, while adaptive threshold scaling may be used to minimize static power consumption at lower frequencies, without the use of an arbitrary safety margin for critical path delays.

Accordingly, average power consumption is minimized over all operating modes, which maximizes the battery life for the mobile device.

Other technical advantages will be readily apparent to one skilled in the art from the following figures, description, and claims.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 1 through 14, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged mobile device.

Figure 1:
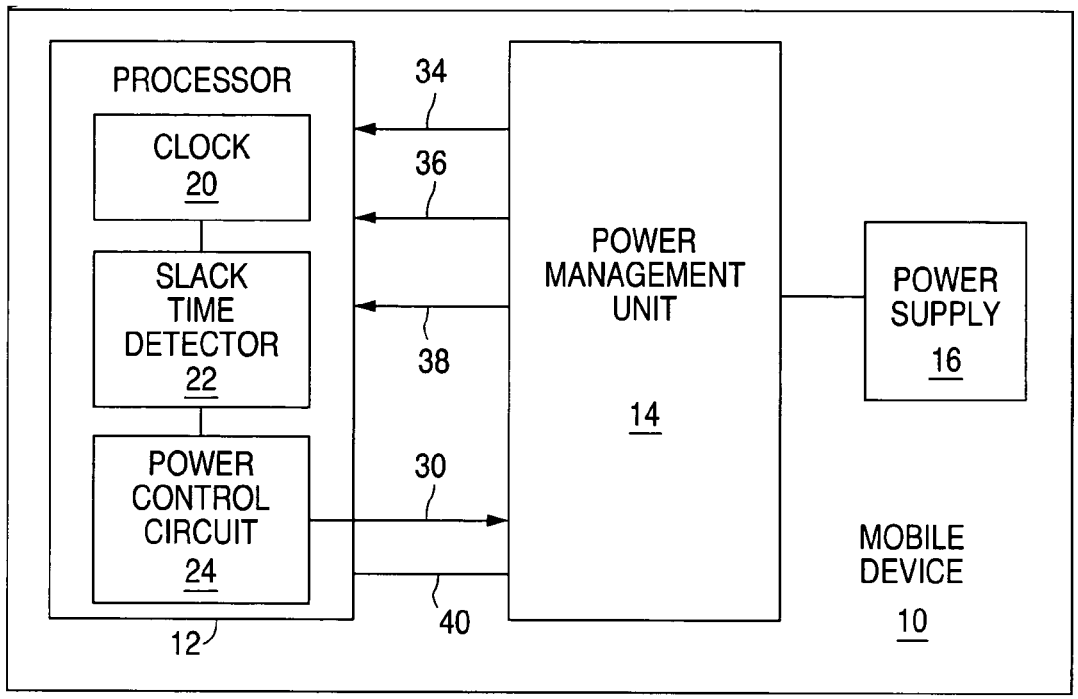
FIG. 1 is a block diagram illustrating a mobile device that is operable to minimize power consumption using cooperative adaptive voltage and threshold scaling in accordance with one embodiment of the present invention.

FIG. 1 is a block diagram illustrating a mobile device 10 that is operable to minimize power consumption using cooperative adaptive voltage and threshold scaling in accordance with one embodiment of the present invention. The mobile device 10 may comprise a mobile telephone, a personal digital assistant or any other suitable type of mobile device.

The mobile device 10 comprises a processor 12, a power management unit 14, and a power supply 16. The mobile device 10 also comprises other suitable components to enable its operation that are not illustrated in FIG. 1.

According to the illustrated embodiment, the processor 12 comprises a processor clock 20, a slack time detector 22, and a power control circuit 24. However, it will be understood that the power control circuit 24 may be separate from the processor 12 without departing from the scope of the present invention. For example, the power control circuit 24 may be a part of the power management unit 14. The processor clock 20 may comprise any suitable oscillator that is operable to generate a clock signal for components of the processor 12.

The slack time detector 22 is coupled to the processor clock and is operable to receive the clock signal generated by the processor clock 20. The slack time detector 22 is also operable to monitor setup and hold times, or the slack time, corresponding to logic gates in the processor 12 based on the clock signal received from the processor clock 20. In addition, the slack time detector 22 is operable to generate power control signals based on the slack time for a specific clock frequency of the processor clock 20.

The power control circuit 24 is coupled to the slack time detector 22 and is operable to receive the power control signals from the slack time detector 22. Based on the power control signals, the power control circuit 24 is operable to generate a voltage control signal 30 for the power management unit 14. The voltage control signal 30 is operable to signal the power management unit 14 to adjust a supply voltage 34 and/or back bias voltages 36 and 38 in order to regulate the power use of the processor 12.

The processor 12 is operable to provide the supply voltage 34 to its logic gates in order allow them to function properly. The processor 12 is also operable to provide the back bias voltages 36 and 38 to its logic gates in order to change the threshold voltages of the PMOS and NMOS devices, respectively, of the logic gates. Thus, the body bias of each p-channel metal-oxide semiconductor field-effect transistor (MOSFET), or PMOS device, may be adjusted using the PMOS back bias voltage 36, and the body bias of each n-channel MOSFET, or NMOS device, may be adjusted using the NMOS back bias voltage 38. As used herein, "each" means every one of at least a subset of the identified items.

The power management unit 14 is coupled to the processor 12 and to the power supply 16. The processor 12 and the power management unit 14 share a common ground 40, which may also be shared by the power supply 16. The power management unit 14 comprises circuitry that is operable to receive the voltage control signal 30 and to generate the supply voltage 34 and the back bias voltages 36 and 38 based on the voltage control signal 30 in order to minimize power consumption. The power management unit 14 is also operable to provide these voltages 34, 36 and 38 to the processor 12.

According to one embodiment, the mobile device 10 comprises a plurality of power management units 14, each of which is operable to minimize power consumption for a corresponding component. For example, a memory of the processor 12 may have a first power management unit 14 that is operable to minimize power consumption for the memory, a multiplier may have a second power management unit 14 that is operable to minimize power consumption for the multiplier, and so on. For this embodiment, each of the components may also have a corresponding slack time detector 22 that is operable to monitor the slack time for the component.

The power supply 16 comprises a battery or other suitable device capable of providing a specified power supply voltage to the power management unit 14. According to one embodiment, the power supply 16 is operable to provide about 0.9 to about 1.2 volts to the power management unit 14, while the ground 40 is operable to provide about 0 volts. However, it will be understood that the power supply 16 may provide any suitable power supply potential, and the ground 40 may provide any suitable potential less than the potential provided by the power supply 16.

In operation, the power management unit 14 provides the supply voltage 34, the PMOS back bias voltage 36 and the NMOS back bias voltage 38 to the processor 12. The slack time detector 22 receives the clock signal from the processor clock 20 and receives the voltages 34, 36 and 38 from the power management unit 14. Based on these, the slack time detector 22 generates power control signals for the power control circuit 24. The power control circuit 24 receives the power control signals from the slack time detector 22 and generates the voltage control signal 30 for the power management unit 14. The power management unit 14 receives the voltage control signal 30 and generates the supply voltage 34, the PMOS back bias voltage 36 and the NMOS back bias voltage 38 for the processor 12.

Thus, in this way, a closed-loop configuration is implemented in the mobile device 10. This allows continuous cooperation between the power management unit 14, the slack time detector 22 and the power control circuit 24 in order to determine and generate the optimum supply voltage 34, PMOS back bias voltage 36 and NMOS back bias voltage 38 for meeting timing constraints and minimizing power consumption over all operating modes for the mobile device 10. Furthermore, these voltages 34, 36 and 38 are continuously generated based on actual operating conditions, as opposed to being selected by software that forces the processor 12 into a particular operating mode based on the task currently being performed.

Figure 2:
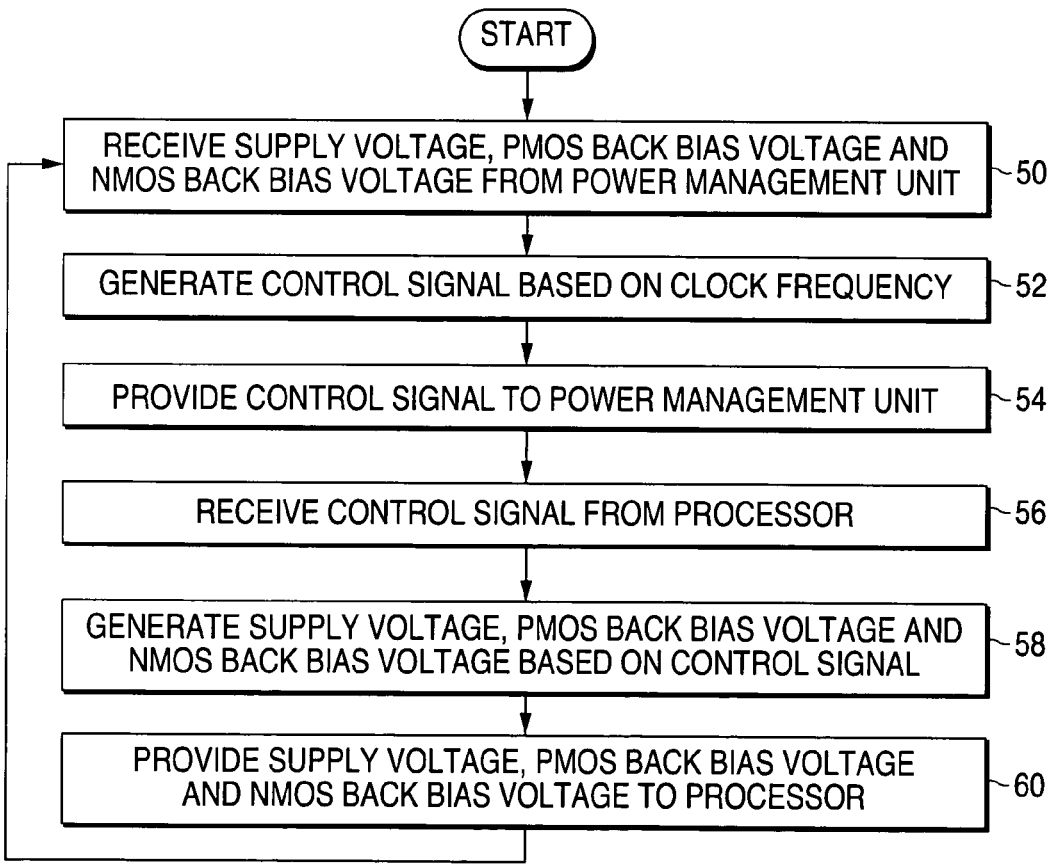
FIG. 2 is a flow diagram illustrating a method for using cooperative adaptive voltage and threshold scaling in the mobile device of FIG. 1 in accordance with one embodiment of the present invention.

FIG. 2 is a flow diagram illustrating a method for using cooperative adaptive voltage and threshold scaling in the mobile device 10 in accordance with one embodiment of the present invention. The method begins at step 50 where the processor 12 receives the supply voltage 34, the PMOS back bias voltage 36 and the NMOS back bias voltage 38 from the power management unit 14.

At step 52, the processor 12 generates the voltage control signal 30 based on the clock frequency for the processor clock 20, which is based on the supply voltage 34, the PMOS back bias voltage 36 and the NMOS back bias voltage 38. At step 54, the processor 12 provides the voltage control signal 30 to the power management unit 14. At step 56, the power management unit 14 receives the voltage control signal 30 from the processor 12.

At step 58, the power management unit 14 generates the supply voltage 34, the PMOS back bias voltage 36 and the NMOS back bias voltage 38 based on the voltage control signal 30. At step 60, the power management unit 14 provides the supply voltage 34, the PMOS back bias voltage 36 and the NMOS back bias voltage 38 to the processor 12, after which the method returns to step 50.

In this way, the supply voltage 34, the PMOS back bias voltage 36 and the NMOS back bias voltage 38 may be adjusted based on the clock frequency of the processor clock 20 and the clock frequency may be adjusted based on the supply voltage 34. Thus, for example, if the clock frequency changes, the optimum supply voltage 34, PMOS back bias voltage 36 and NMOS back bias voltage 38 for meeting timing constraints and minimizing power consumption over all operating modes for the mobile device 10 are determined based on the new clock frequency and provided to the processor 12 for operation.

Similarly, if the supply voltage 34 for the mobile device 10 changes, such as may occur when the power supply 16 begins to lose power, the supply voltage 34, the PMOS back bias voltage 36 and the NMOS back bias voltage 38 provided to the processor 12 may be adjusted, causing a change in the clock frequency for the processor clock 20.

Figure 3:
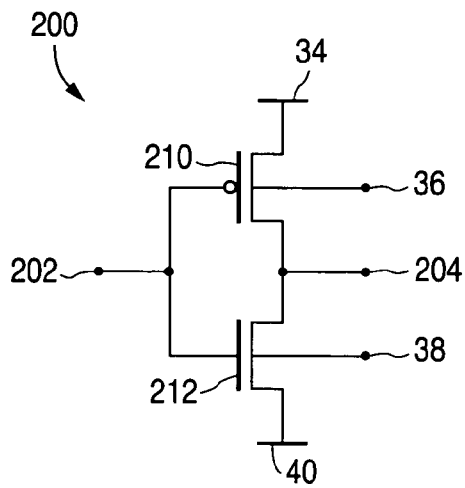
FIG. 3 is a circuit diagram illustrating a logic gate in the processor of FIG. 1 in accordance with one embodiment of the present invention.

FIG. 3 is a circuit diagram illustrating a logic gate 200 in the processor 12 in accordance with one embodiment of the present invention. The illustrated logic gate 200, which is an example of one type of logic gate that may be included in the processor 12, comprises an inverter. Thus, in addition to static logic gates, such as the logic gate 200, it will be understood that the logic gates included in the processor 12 may also comprise dynamic, domino or any other suitable types of logic gates without departing from the scope of the present invention.

The logic gate 200 is operable to receive an input signal 202 and to generate an output signal 204 based on the input signal 202. For the illustrated embodiment in which the logic gate 200 comprises an inverter, the input signal 202 is inverted in order to generate the output signal 204.

The logic gate 200 comprises a PMOS device 210 and an NMOS device 212. The PMOS and NMOS devices 210 and 212 each comprise triple-well devices. The PMOS device 210 comprises a source that is coupled to the supply voltage 34, a gate that is coupled to the input signal 202, a drain that is coupled to the output signal 204, and a body that is coupled to the PMOS back bias voltage 36. The NMOS device 212 comprises a source that is coupled to ground 40, a gate that is coupled to the input signal 202, a drain that is coupled to the output signal 204 and to the drain of the PMOS device 210, and a body that is coupled to the NMOS back bias voltage 38.

Thus, the logic gate 200 is operable to function using a variable supply voltage 34 and variable back bias voltages 36 and 38 generated by the power management unit 14 based on the voltage control signal 30. For example, the supply voltage 34 may be reduced during higher frequency modes in order to reduce dynamic power consumption, while the PMOS back bias voltage 36 may be increased and the NMOS back bias voltage 38 may be decreased during lower frequency modes in order to reduce static power consumption. In this way, the power consumption of the logic gate 200, in conjunction with the other logic gates of the processor 12, may be minimized across all operating modes.

Figure 4:
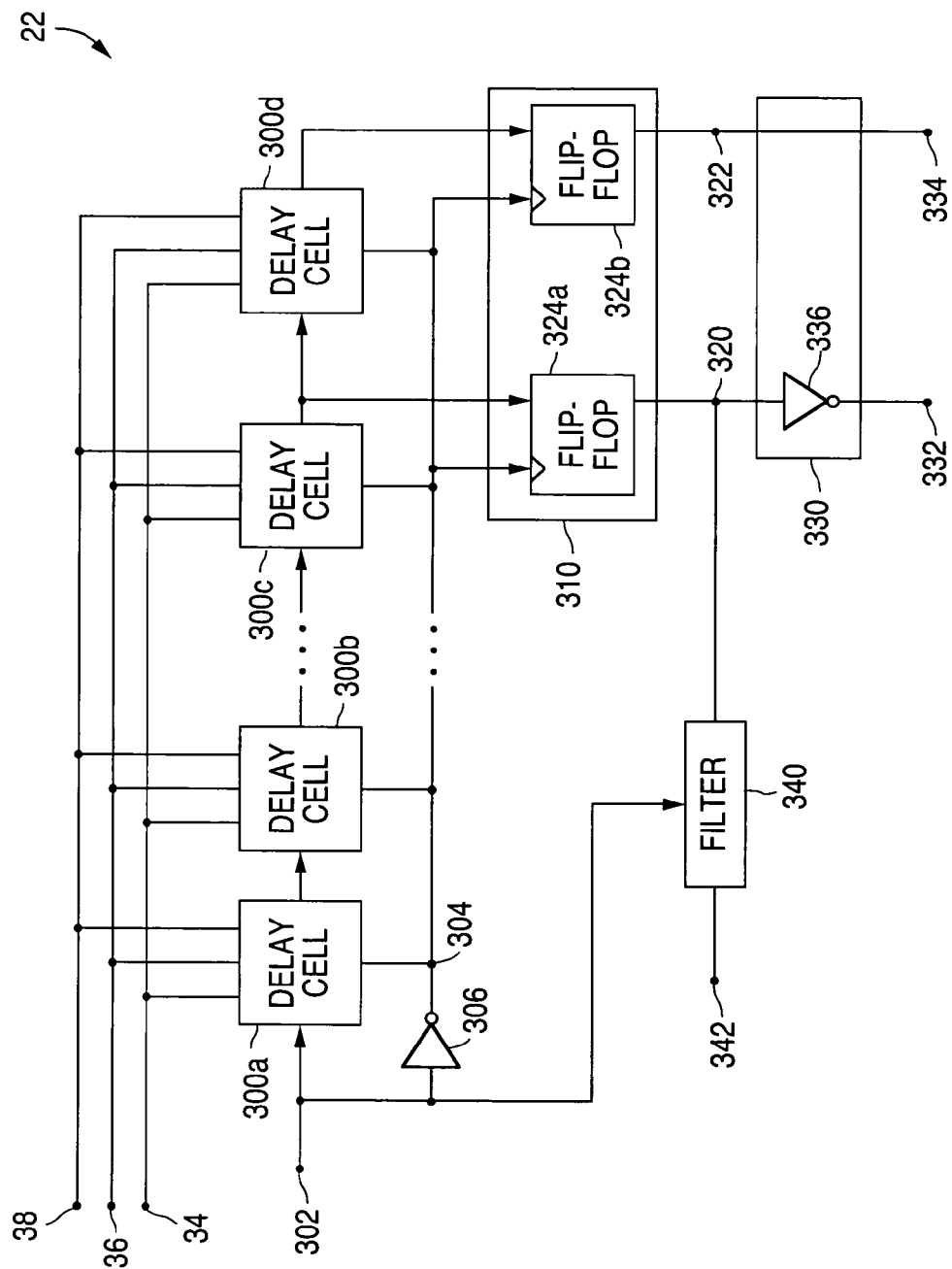
FIG. 4 is a block diagram illustrating the slack time detector of FIG. 1 in accordance with one embodiment of the present invention.

FIG. 4 is a block diagram illustrating the slack time detector 22 in accordance with one embodiment of the present invention. The illustrated slack time detector 22 comprises a delay line; however, it will be understood that the slack time detector 22 may comprise any suitable circuit operable to measure the response of logic gates in the processor 12 relative to the processor clock 20 without departing from the scope of the present invention.

The slack time detector 22 comprises a timing comparison circuit. According to the illustrated embodiment, the timing comparison circuit comprises a plurality of delay cells 300 that are operable to allow a measurement of timing requirements for the processor 12. For an alternative embodiment, the timing comparison circuit may comprise a replicated critical path, as opposed to the delay cells 300, that is operable to allow a measurement of timing requirements for the processor 12.

For the illustrated embodiment, each of the delay cells 300 are operable to receive the supply voltage 34 and the back bias voltages 36 and 38. In addition, an initial delay cell 300a is operable to receive a clock signal 302 from the processor clock 20. This clock signal 302 is operable to be processed through each of the delay cells 300 until the processing is halted by the delay cells 300 being reset. The delay cells 300 are operable to be reset by an inverted clock signal 304 that is generated by an inverter 306 coupled to the clock signal 302.

The slack time detector 22 also comprises a register 310 that is operable to receive the output from a first designated delay cell 300c and the output from a second designated delay cell 300d. Although the second designated delay cell 300d may be directly coupled to the first designated delay cell 300c, it will be understood that any suitable number of delay cells 300 may be coupled between the first and second designated delay cells 300c and 300d without departing from the scope of the present invention. The register 310 is also operable to generate a first status signal 320 based on the output from the first designated delay cell 300c and a second status signal 322 based on the output from the second designated delay cell 300d.

According to one embodiment, the register 310 comprises a pair of edge-triggered flip-flops 324, each of which is operable to receive the inverted clock signal 304 as a clock input. Thus, according to this embodiment, the first flip-flop 324a is operable to receive the output from the first designated delay cell 300c and to generate the first status signal 320 based on that output, and the second flip-flop 324b is operable to receive the output from the second designated delay cell 300d and to generate the second status signal 322 based on that output.

The slack time detector 22 also comprises a decoder 330 that is operable to receive the first and second status signals 320 and 322 and to generate first and second power control signals 332 and 334 based on the status signals 320 and 322. According to one embodiment, the decoder 300 comprises an inverter 336 that is operable to invert the first status signal 320 in order to generate the first power control signal 332, while the second power control signal 334 is simply the same signal as the second status signal 322.

The slack time detector 22 may also comprise a digital filter 340 that is operable to receive the clock signal 302 and the first status signal 320. The filter 340 is also operable to average a specified number of first status signals 320 in order to generate a steady clock signal 342. According to one embodiment, the filter 340 is operable to average from two to eight first status signals 320 in order to generate one steady clock signal 342. However, it will be understood that the filter 340 may be operable to average any suitable number of first status signals 320 in order to generate one steady clock signal 342 without departing from the scope of the present invention.

In operation, according to one embodiment, the initial delay cell 300a of the slack time detector 22 receives a rising clock edge for the clock signal 302 from the processor clock 20. This logic high input signal is provided to a subsequent delay cell 300b, and so on, until the inverted clock signal 304 provides a logic high when the clock signal 302 goes low.

This allows the register 310 to latch the output of the first designated delay cell 300c in the first flip-flop 324a and the output of the second designated delay cell 300d in the second flip-flop 324b. The output of the first flip-flop 324a, the first status signal, is provided to the filter 340 for averaging to generate the steady clock signal 342.

In addition, the first status signal 320 is inverted in the decoder 330 to generate the first power control signal 332, and the second status signal, which is the output from the second flip-flop 324b of the register 310, is provided as the second power control signal 334.

When the logic high from the rising edge of the clock signal 302 fails to reach the first designated delay cell 300c, the processor 12 requests more power by generating a logic high for the first power control signal 332 and a logic low for the second power control signal 334.

When the logic high from the rising edge of the clock signal 302 reaches the first designated delay cell 300c but not the second designated delay cell 300d, the processor 12 is running under optimum conditions for meeting timing requirements and minimizing power consumption. In this case, the processor 12 requests no change in power by generating a logic low for the first power control signal 332 and a logic low for the second power control signal 334.

Finally, when the logic high from the rising edge of the clock signal 302 fails to reach both the first and second designated delay cells 300c and 300d, the processor 12 requests less power by generating a logic low for the first power control signal 332 and a logic high for the second power control signal 334.

Figure 5:
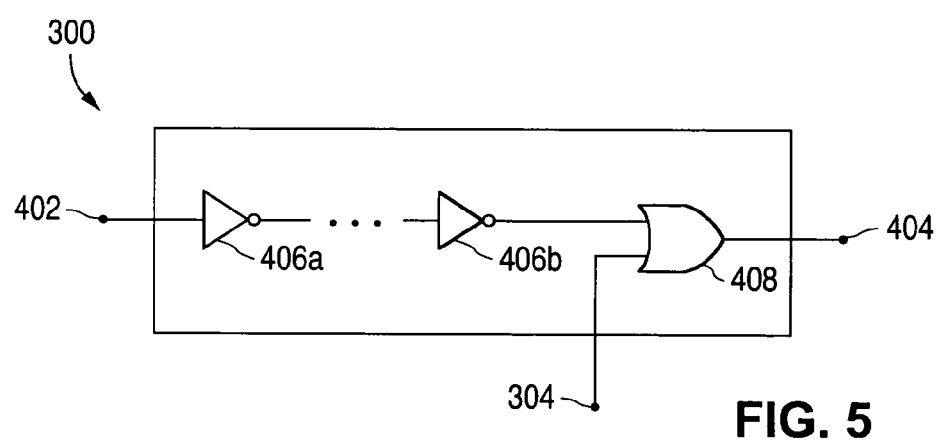
FIG. 5 is a circuit diagram illustrating one of the delay cells of FIG. 4 in accordance with one embodiment of the present invention.

FIG. 5 is a circuit diagram illustrating one of the delay cells 300 in accordance with one embodiment of the present invention. According to this embodiment, the delay cell 300 comprises an input terminal 402 that is operable to receive as an input signal the output signal from a previous delay cell 300 in the delay line or, in the case of the initial delay cell 300a, the clock signal 302. The delay cell 300 also comprises on output terminal 404 that is operable to provide an output signal for the input terminal of a subsequent delay cell 300 based on the input signal received at the input terminal 402.

According to one embodiment, the delay cell 300 also comprises one or more inverters 406 and a NOR gate 408. The NOR gate is coupled to the final inverter 406b and is operable to receive the output of the final inverter 406b, in addition to the inverted clock signal 304, which acts as a reset signal for the delay cell 300. The delay cell 300 comprises an odd number of inverters 406 such that the NOR gate 408 receives a signal that is inverted with respect to the input signal received at the input terminal 402.

Figure 6:
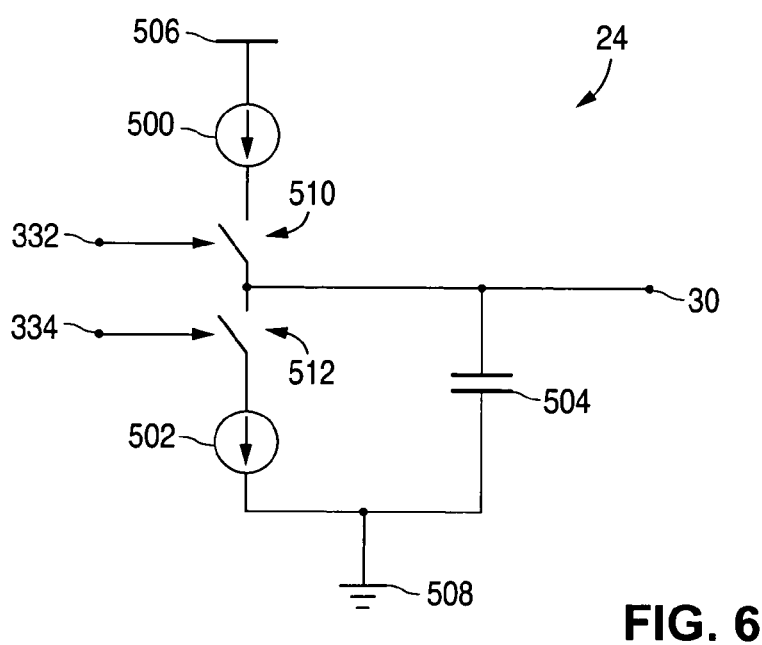
FIG. 6 is a circuit diagram illustrating the power control circuit of FIG. 1 in accordance with one embodiment of the present invention.

FIG. 6 is a circuit diagram illustrating the power control circuit 24 in accordance with one embodiment of the present invention. The power control circuit 24 is operable to receive the first power control signal 332 and the second power control signal 334 and to generate the voltage control signal 30 based on the power control signals 332 and 334.

According to this embodiment, the power control circuit 24 comprises a power up current source 500, a power down current source 502, and a capacitor 504. The power up current source 500 is operable to pump up the capacitor 504, and the power down current source 502 is operable to pull down the capacitor 504. The power control circuit 24 also comprises an input potential 506, which may correspond to the supply voltage 34, and a ground 508, which may correspond to the ground 40 for the processor 12.

The power up current source 500 is coupled to the input potential 506 and may be coupled to the capacitor 504 through a switch 510. According to one embodiment, the switch 510 comprises a high breakdown, vertical metal-oxide semiconductor structure, such as a depletion metal-oxide semiconductor (DMOS) switch. However, it will be understood that the switch 510 may comprise any suitable switch without departing from the scope of the present invention.

The switch 510 is operable to be opened or closed based on the first power control signal 332. Thus, for a first power control signal 332 corresponding to a request for more power, the switch 510 may be closed, allowing the power up current source 500 to pump up the capacitor 504. Similarly, for a first power control signal 332 corresponding to no request for more power, the switch 510 may be opened such that the current source 500 is uncoupled from the capacitor 504.

A first terminal of the power down current source 502 is coupled to the ground 508 and to the capacitor 504. A second terminal of the power down current source 502 may be coupled to the capacitor 504 through a switch 512. According to one embodiment, the switch 512 comprises a high breakdown, vertical metal-oxide semiconductor structure, such as a DMOS switch. However, it will be understood that the switch 512 may comprise any suitable switch without departing from the scope of the present invention.

The switch 512 is operable to be opened or closed based on the second power control signal 334. Thus, for a second power control signal 334 corresponding to a request for less power, the switch 512 may be closed, allowing the power down current source 502 to pull down the capacitor 504. Similarly, for a second power control signal 334 corresponding to no request for less power, the switch 512 may be opened such that the second terminal of the current source 502 is uncoupled from the capacitor 504.

Figure 7:
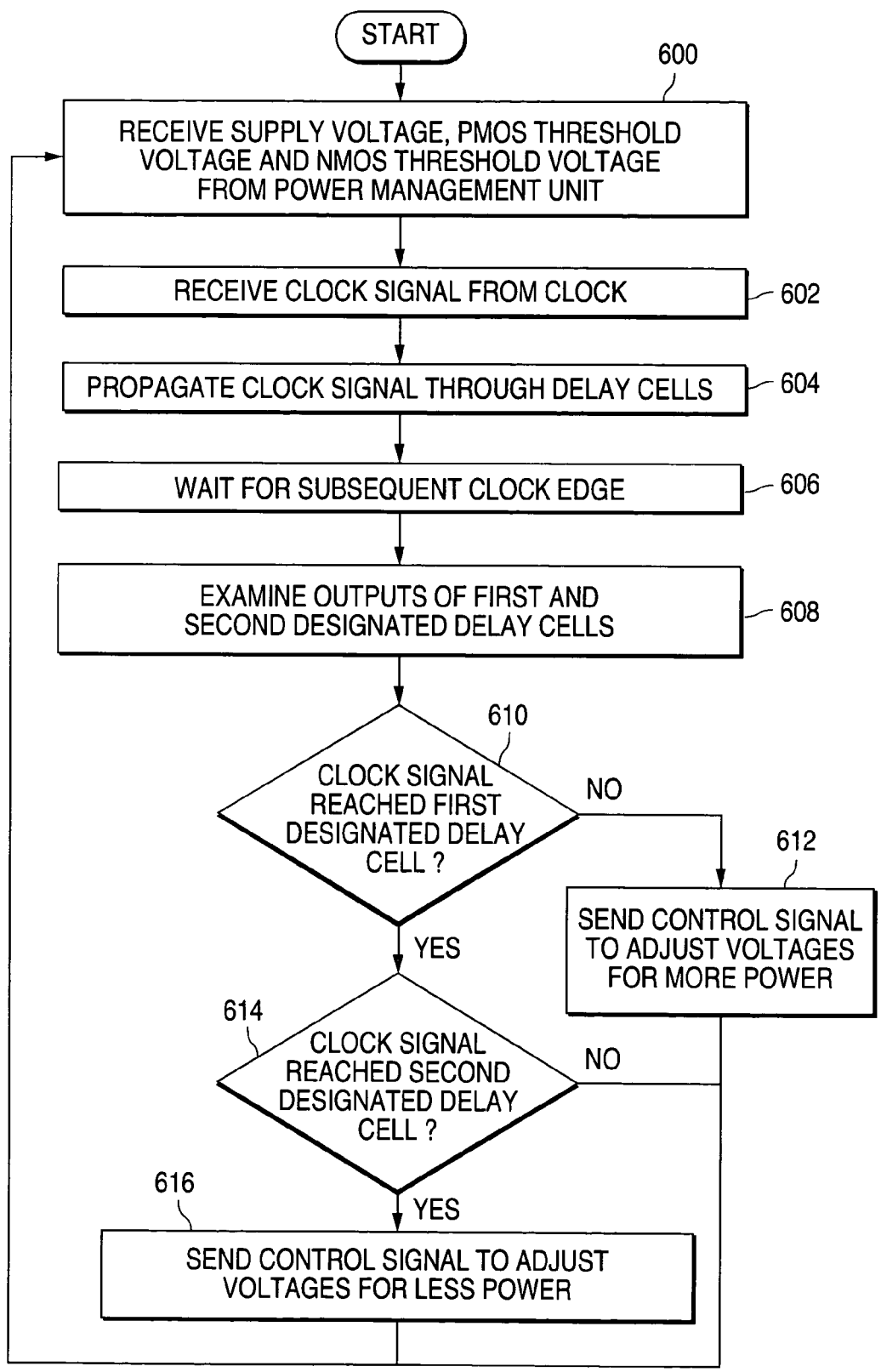
FIG. 7 is a flow diagram illustrating a method for using cooperative adaptive voltage and threshold scaling in the processor of FIG. 1 in accordance with one embodiment of the present invention.

FIG. 7 is a flow diagram illustrating a method for using cooperative adaptive voltage and threshold scaling in the processor 12 in accordance with one embodiment of the present invention. The method begins at step 600 where the supply voltage 34, the PMOS back bias voltage 36, and the NMOS back bias voltage 38 are received from the power management unit 14. At step 602, a clock signal is received from the processor clock 20.

At step 604, the clock signal is propagated through a plurality of delay cells 300. At step 606, the slack time detector 22 waits for a subsequent clock edge from the processor clock 20. At step 608, the outputs of the first designated delay cell 300c and the second designated delay cell 300d are examined.

At decisional step 610, a determination is made regarding whether or not the clock signal reached the first designated delay cell 300c. If the clock signal failed to reach the first designated delay cell 300c, the method follows the No branch from decisional step 610 to step 612. At step 612, the processor 12 sends a voltage control signal 30 to the power management unit 14 to request an adjustment of the voltages 34, 36 and/or 38 for more power. At this point, the method returns to step 600 to continue monitoring the processor 12 for future adjustments to the voltages 34, 36 and/or 38.

Returning to decisional step 610, if the clock signal reached the first designated delay cell 300c, the method follows the Yes branch from decisional step 610 to decisional step 614. At decisional step 614, a determination is made regarding whether or not the clock signal reached the second designated delay cell 300d. If the clock signal failed to reach the second designated delay cell 300d, the supply voltage 34, PMOS back bias voltage 36 and NMOS back bias voltage 38 are properly adjusted to meet timing constraints and minimize power consumption over all operating modes for the mobile device 10, and the method follows the No branch from decisional step 614 and returns to step 600 to continue monitoring the processor 12 for future adjustments to the voltages 34, 36 and/or 38.

Returning to decisional step 614, if the clock signal reached the second designated delay cell 300d, the method follows the Yes branch from decisional step 614 to step 616. At step 616, the processor 12 sends a voltage control signal 30 to the power management unit 14 to request an adjustment of the voltages 34, 36 and/or 38 for less power. At this point, the method returns to step 600 to continue monitoring the processor 12 for future adjustments to the voltages 34, 36 and/or 38.

In this way, a closed-loop configuration is implemented between the processor 12 and the power management unit 14, allowing continuous cooperation between the power management unit 14, the slack time detector 22 and the power control circuit 24 in order to determine and generate the optimum supply voltage 34, PMOS back bias voltage 36 and NMOS back bias voltage 38 for meeting timing constraints and minimizing power consumption over all operating modes for the processor 12.

Figure 8:
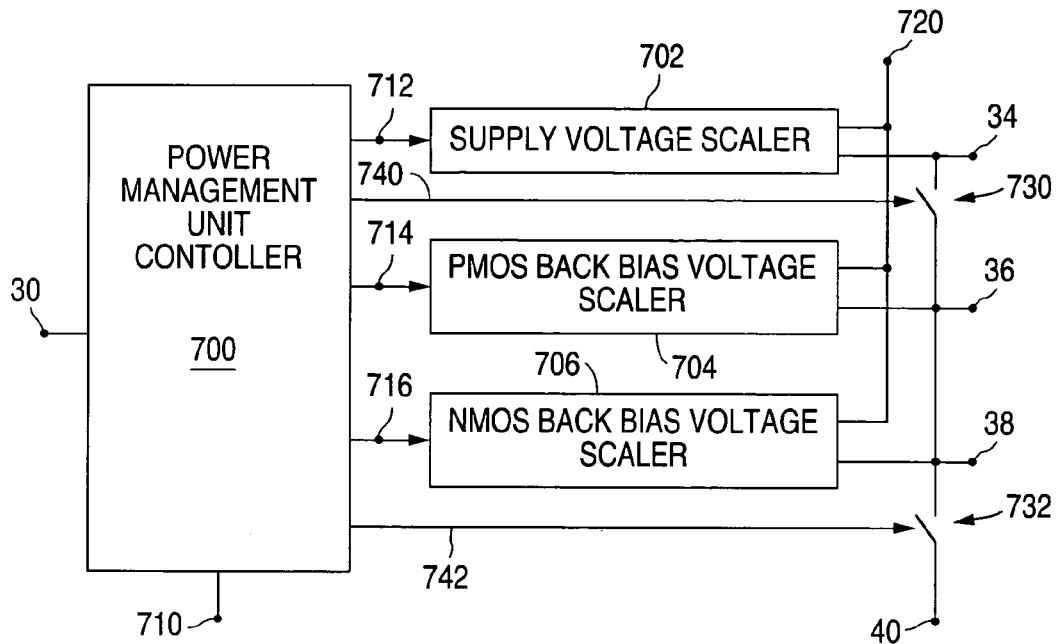
FIG. 8 is a block diagram illustrating the power management unit of FIG. 1 in accordance with one embodiment of the present invention.

FIG. 8 is a block diagram illustrating the power management unit 14 in accordance with one embodiment of the present invention. The power management unit 14 is operable to receive the voltage control signal 30 from the power control circuit 24 and to generate the supply voltage 34, the PMOS back bias voltage 36, and the NMOS back bias voltage 38 based on the voltage control signal 30. According to this embodiment, the power management unit 14 comprises a power management unit controller 700, a supply voltage scaler 702, a PMOS back bias voltage scaler 704, and an NMOS back bias voltage scaler 706.

The power management unit controller 700 is operable to receive the voltage control signal 30 and a reference signal 710. The reference signal 710 may comprise a bandgap reference voltage, a clock reference signal, or any other suitable signal operable to provide a reference for the power management unit controller 700. Based on the voltage control signal 30 and the reference signal 710, the power management unit controller 700 generates a supply voltage reference signal 712 for the supply voltage scaler 702, a PMOS back bias voltage reference signal 714 for the PMOS back bias voltage scaler 704, and an NMOS back bias voltage reference signal 716 for the NMOS back bias voltage scaler 706. The scalers 702, 704 and 706 are also operable to receive a power supply voltage 720, which may correspond to the power supply 16 for the mobile device 10.

Based on the reference signals 712, 714 and 716, in addition to the power supply voltage 720, the supply voltage scaler 702, the PMOS back bias voltage scaler 704, and the NMOS back bias voltage scaler 706 are operable to generate the supply voltage 34, the PMOS back bias voltage 36, and the NMOS back bias voltage 38, respectively.

According to one embodiment, the supply voltage scaler 702 comprises a high frequency, high efficiency, switching power supply, the PMOS back bias voltage scaler 704 comprises a low dropout or switching power supply or a charge pump, and the NMOS back bias voltage scaler 706 comprises a switching power supply or charge pump. However, it will be understood that the scalers 702, 704 and 706 may comprise any other suitable components operable to generate the voltages 34, 36 and 38 based on the reference signals 712, 714 and 716 without departing from the scope of the present invention.

The power management unit 14 also comprises a PMOS switch 730 and an NMOS switch 732. According to one embodiment, the switches 730 and 732 each comprise a high breakdown, vertical metal-oxide semiconductor structure, such as a DMOS switch. However, it will be understood that the switches 730 and 732 may each comprise any suitable switch without departing from the scope of the present invention.

The power management unit 14 is operable to place the mobile device 10 into an open operating mode by opening the switches 730 and 732 and into a closed operating mode by closing the switches 730 and 732. Based on the voltage control signal 30, the power management unit controller 700 is operable to provide a PMOS switch signal 740 to the PMOS switch 730 and an NMOS switch signal 742 to the NMOS switch 732. These switch signals 740 and 742 are operable to either open or close the corresponding switches 730 and 732. It will be understood that the switch signals 740 and 742 may comprise a single signal provided to both switches 730 and 732.

Thus, when the mobile device 10 is in the open mode, the PMOS back bias voltage scaler 704 generates the PMOS back bias voltage 36 and the NMOS back bias voltage scaler 706 generates the NMOS back bias voltage 38. When the mobile device 10 is in the closed mode, the PMOS back bias voltage 36 is the same as the supply voltage 34, which is generated by the supply voltage scaler 702, and the NMOS back bias voltage 38 is the same as ground 40. Therefore, in the open mode, any of the voltages 34, 36 and 38 may be adjusted independently, while in the closed mode, the supply voltage 34 may be adjusted, with the PMOS back bias voltage 36 tracking the supply voltage 34 and the NMOS back bias voltage 38 remaining at ground 40.

Figure 9:
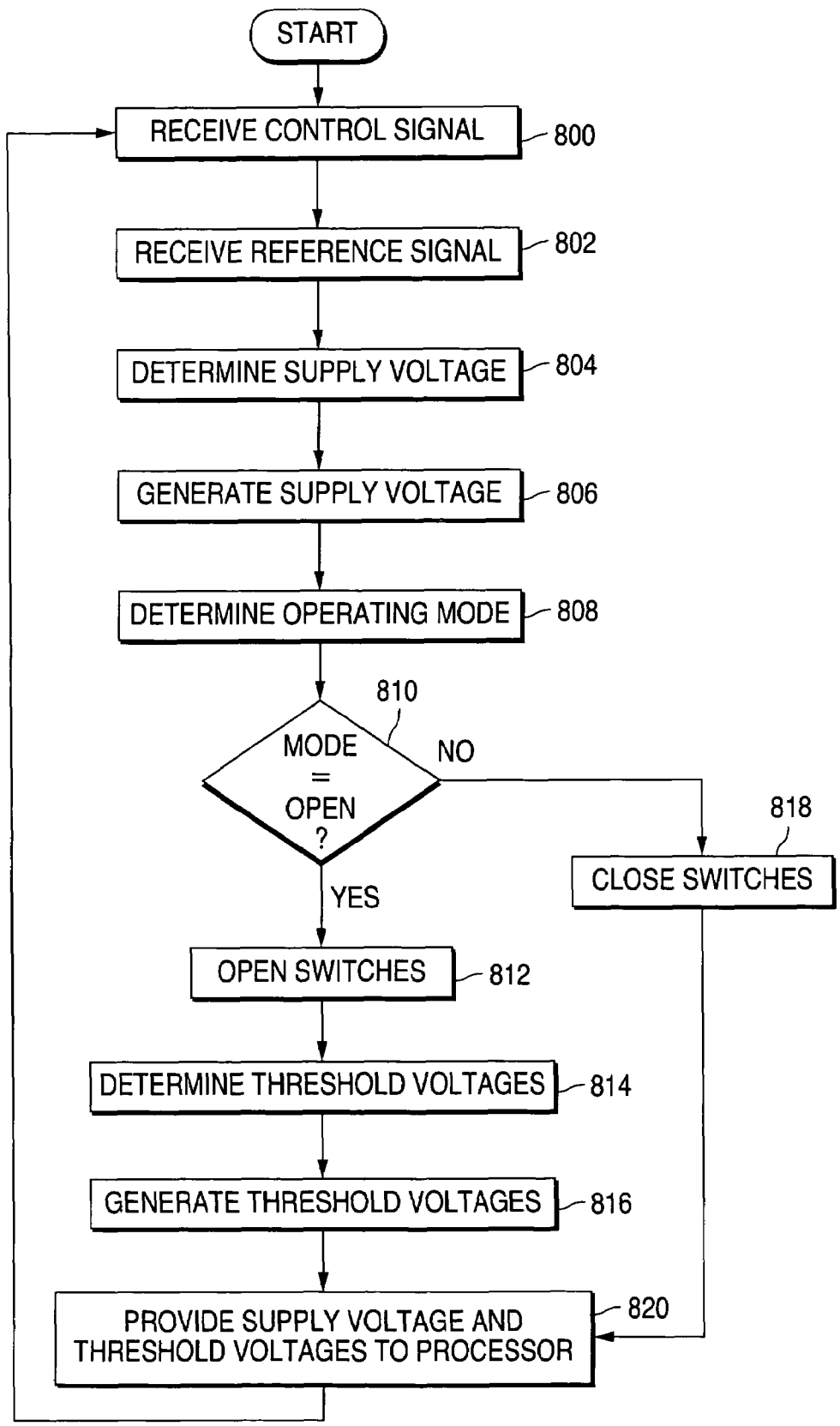
FIG. 9 is a flow diagram illustrating a method for using cooperative adaptive voltage and threshold scaling in the power management unit of FIG. 1 in accordance with one embodiment of the present invention.

FIG. 9 is a flow diagram illustrating a method for using cooperative adaptive voltage and threshold scaling in the power management unit 14 in accordance with one embodiment of the present invention. The method begins at step 800 where the voltage control signal 30 is received from the power control circuit 24. At step 802, the reference signal 710 is received.

At step 804, the supply voltage 34 is determined by the supply voltage scaler 702 based on the supply voltage reference signal 712 generated by the power management unit controller 700. At step 806, the supply voltage 34 is generated by the power management unit 14. At step 808, the power management unit controller 700 determines into which operating mode the mobile device 10 is to be placed based on the voltage control signal 30.

At decisional step 810, a determination is made regarding whether or not the operating mode is open. If the operating mode is open, the method follows the Yes branch from decisional step 810 to step 812. At step 812, the power management unit controller 700 generates switch signals 740 and 742 to open the switches 730 and 732, respectively.

At step 814, the PMOS back bias voltage 36 is determined by the PMOS back bias voltage scaler 704 based on the PMOS back bias voltage reference signal 714 generated by the power management unit controller 700, and the NMOS back bias voltage 38 is determined by the NMOS back bias voltage scaler 706 based on the NMOS back bias voltage reference signal 716 generated by the power management unit controller 700. At step 816, the back bias voltages 36 and 38 are generated by the power management unit 14.

Returning to decisional step 810, if the operating mode is not open, the method follows the No branch from decisional step 810 to step 818. At step 818, the power management unit controller 700 generates switch signals 740 and 742 to close the switches 730 and 732, respectively.

From steps 816 and 818, the method continues to step 820. At step 820, the power management unit 14 provides the supply voltage 34, the PMOS back bias voltage 36 and the NMOS back bias voltage 38 to the processor 12.

In this way, a closed-loop configuration is implemented between the power management unit 14 and the processor 12, allowing continuous cooperation between the power management unit 14, the slack time detector 22 and the power control circuit 24 in order to determine and generate the optimum supply voltage 34, PMOS back bias voltage 36 and NMOS back bias voltage 38 for meeting timing constraints and minimizing power consumption over all operating modes for the processor 12.

Figure 10:
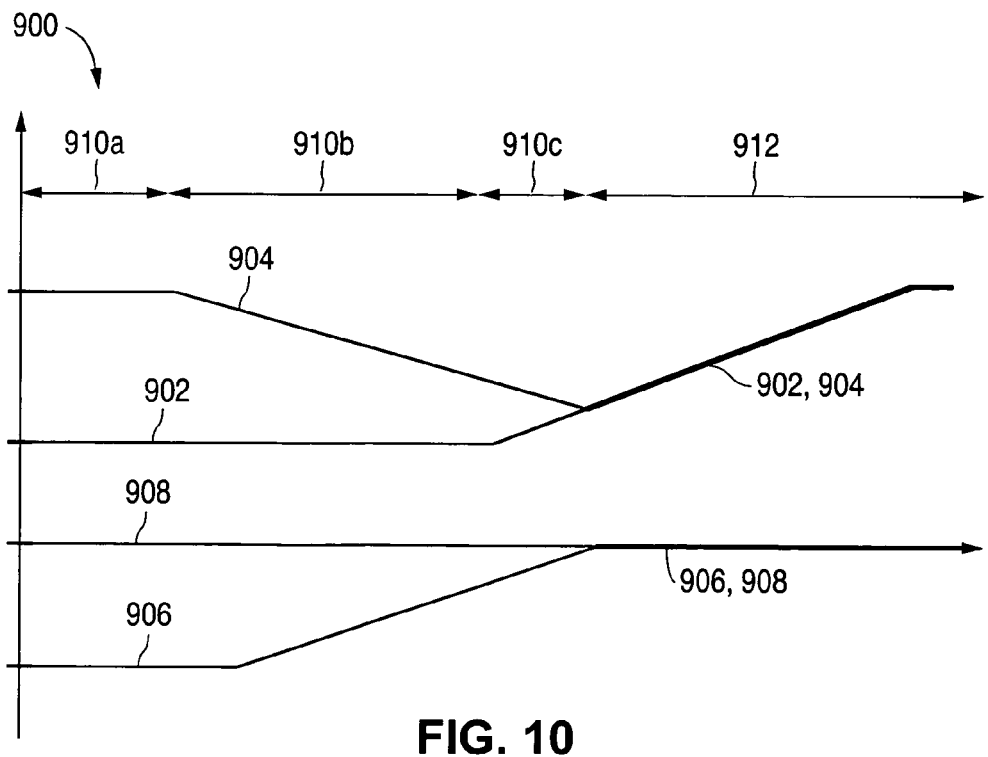
FIG. 10 is a graph illustrating selected voltage signals in the mobile device of FIG. 1 as a function of clock frequency in accordance with one embodiment of the present invention.

FIG. 10 is a graph 900 illustrating selected voltage signals in the mobile device 10 as a function of clock frequency for the processor clock 20 in accordance with one embodiment of the present invention. The level of the supply voltage 34 is illustrated as line 902, the level of the PMOS back bias voltage 36 is illustrated as line 904, the level of the NMOS back bias voltage 38 is illustrated as line 906, and the ground 40, which remains at a constant level, is illustrated as line 908.

The graph 900 may be divided into two main operating mode sections: the open mode section 910 and the closed mode section 912. The open mode section 910 may be further subdivided into three subsections. The first open mode subsection 910a corresponds to the open mode with none of the voltages 34, 36 and 38 being adjusted by the power management unit 14. Thus, for the first operating mode subsection 910a, the lines 902, 904 and 906 remain horizontal, indicating a constant voltage level.

The second open mode subsection 910b corresponds to the open mode with the PMOS back bias voltage 36, and as the frequency increases the NMOS back bias voltage 38, being adjusted by the power management unit 14, while the supply voltage 34 remains unadjusted. The third open mode subsection 910c corresponds to the open mode with each of the voltages 34, 36 and 38 being adjusted by the power management unit 14.

For the closed mode section 912, the PMOS and NMOS switches 730 and 732 are closed by the PMOS and NMOS switch signals 740 and 742, respectively. Thus, the PMOS back bias voltage line 904 tracks the supply voltage line 902, while the NMOS back bias voltage line 906 tracks the ground line 40.

Thus, based on the clock frequency of the processor clock 20, which is increasing from left to right on the horizontal axis, a corresponding voltage control signal 30 may be determined. Using the voltage control signal 30, the power management unit 14 is operable to generate the appropriate voltages 34, 36 and 38, as illustrated in the graph 900. Alternatively, based on the voltages 34, 36 and 38, the processor 12 may provide a clock signal of the corresponding clock frequency from the processor clock 20.

Figure 11:
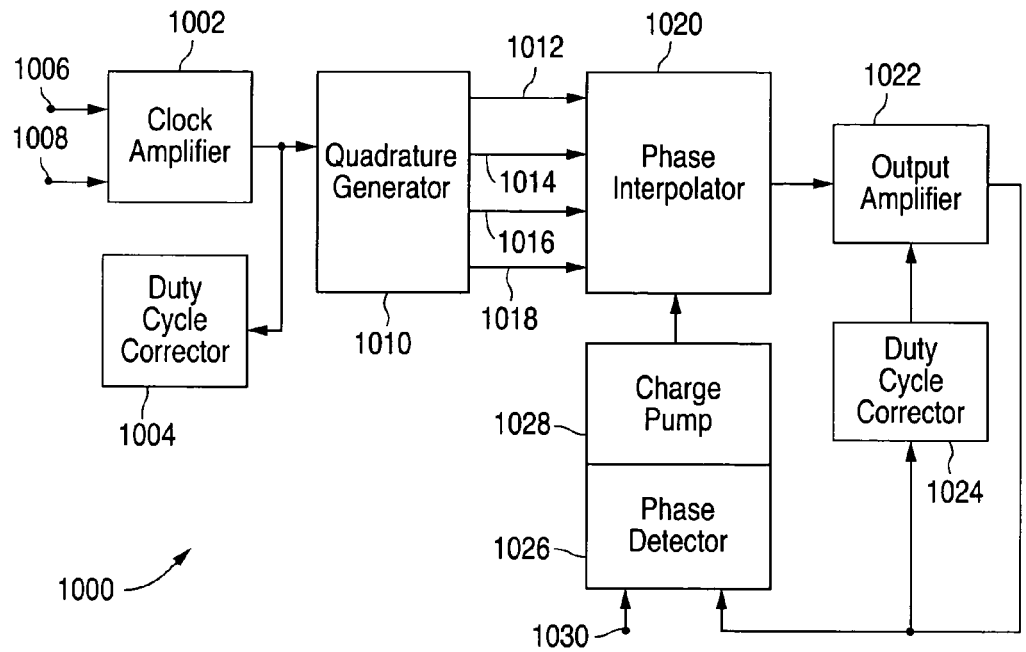
FIG. 11 is a block diagram illustrating an analog delay lock loop that is operable to minimize power consumption in a mobile device using cooperative adaptive voltage and threshold scaling in accordance with one embodiment of the present invention.

FIG. 11 is a block diagram illustrating an analog delay lock loop 1000 that is operable to minimize power consumption in a mobile device, such as the mobile device 10, using cooperative adaptive voltage and threshold scaling in accordance with one embodiment of the present invention.

The analog delay lock loop 1000 comprises a clock amplifier 1002 and a duty cycle corrector 1004. The clock amplifier 1002 is operable to receive a reference voltage signal 1006 and an external clock signal 1008, to amplify the external clock signal 1008 based on the reference voltage signal 1006, and to provide the amplified signal to the duty cycle corrector 1004. The duty cycle corrector 1004 is operable to filter the amplified signal to generate a more accurate clock signal.

The analog delay lock loop 1000 also comprises a quadrature generator 1010 that is operable to receive the amplified signal from the clock amplifier 1002 and to generate four quadrature outputs 1012, 1014, 1016 and 1018 based on the amplified signal. For one embodiment, the quadrature outputs may comprise an I output 1012, a Q output 1014 that is 90° out of phase with the I output 1012, an inverted I output 1016 that is inverted with respect to the I output 1012, and an inverted Q output 1018 that is inverted with respect to the Q output 1014.

The analog delay lock loop 1000 also comprises a phase interpolator 1020 that is operable to receive the quadrature outputs 1012, 1014, 1016 and 1018 from the quadrature generator 1010 and to generate a phase interpolator signal for an output amplifier 1022. The output amplifier 1022 is operable to amplify the phase interpolator signal from the phase interpolator 1020 and to provide the amplified signal to a duty cycle corrector 1024, which is operable to provide a correction signal to the output amplifier 1022.

The output amplifier 1022 is also operable to provide the amplified signal to a phase detector 1026 that is coupled to a charge pump 1028. The phase detector 1026 is operable to receive a reference clock signal 1030, in addition to the amplified signal. Based on these, the phase detector 1026 and charge pump 1028 are operable to provide an adjustment to the phase interpolator 1020, if needed, in order to ensure that the analog delay lock loop 1000 may lock to the appropriate frequency.

Figure 12:
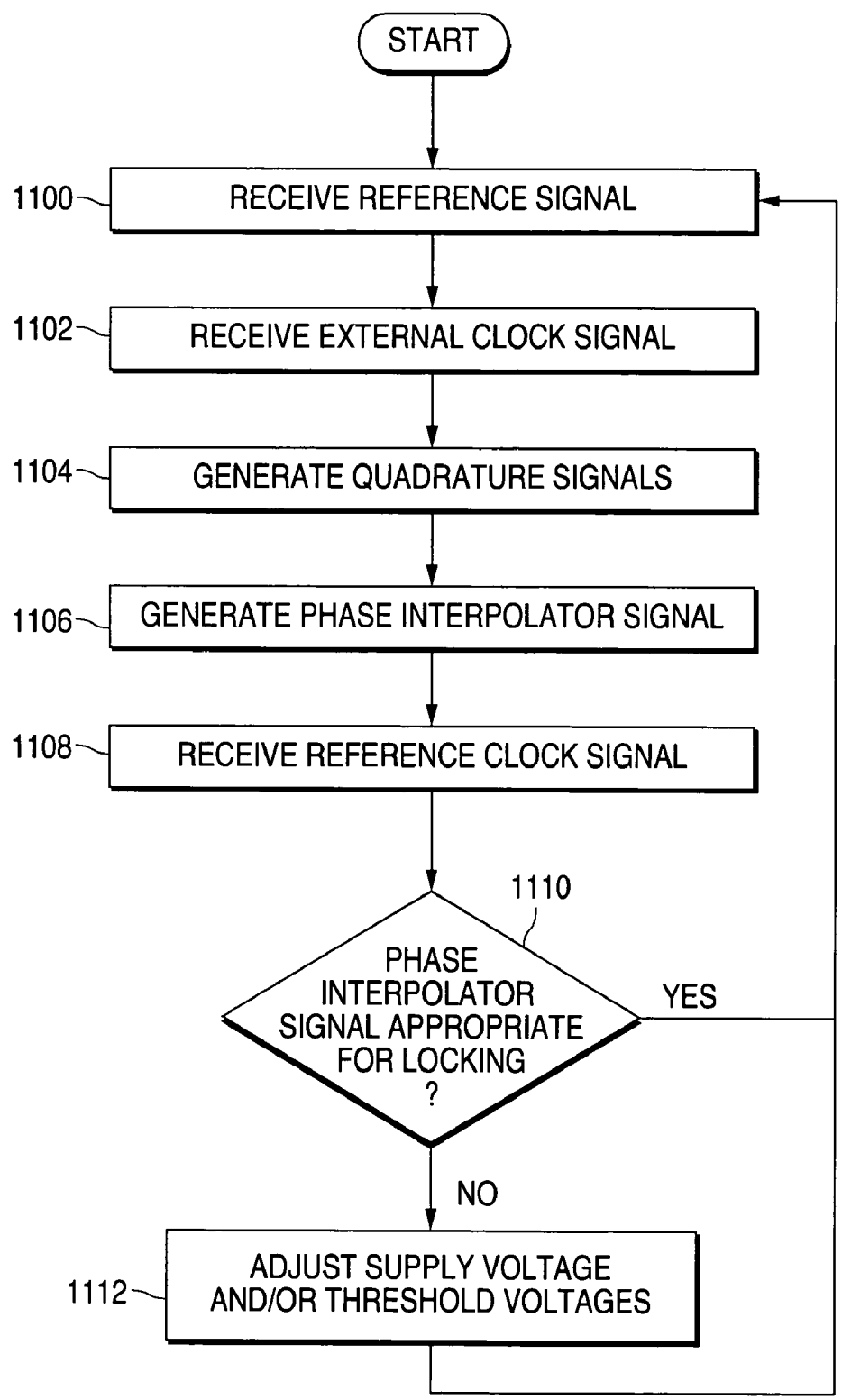
FIG. 12 is a flow diagram illustrating a method for using cooperative adaptive voltage and threshold scaling in the analog delay lock loop of FIG. 11 in accordance with one embodiment of the present invention.

FIG. 12 is a flow diagram illustrating a method for using cooperative adaptive voltage and threshold scaling in the analog delay lock loop 1000 in accordance with one embodiment of the present invention. The method begins at step 1100 where the clock amplifier 1002 receives the reference voltage signal 1006. At step 1102, the clock amplifier 1002 receives the external clock signal 1008.

At step 1104, the quadrature generator 1010 generates the quadrature signals 1012, 1014, 1016 and 1018. At step 1106, the phase interpolator 1020 generates the phase interpolator signal. At step 1108, the phase detector 1026 receives the reference clock signal 1030, in addition to the amplified phase interpolator signal.

At decisional step 1110, a determination is made regarding whether or not the phase interpolator signal is appropriate for locking to the correct frequency. If the phase interpolator signal is appropriate for locking to the correct frequency, the method follows the Yes branch from decisional step 1110 and returns to step 1100 to continue monitoring for any future adjustments to be made.

If the phase interpolator signal is not appropriate for locking to the correct frequency, the method follows the No branch from decisional step 1110 to step 1112. At step 1112, the charge pump 1028 adjusts the supply voltage 34 and/or back bias voltages 36 and 38 in order to shift the phase interpolator signal to the appropriate level for locking to the correct frequency. At this point, the method returns to step 1100 to continue monitoring for any future adjustments to be made.

Figure 13:
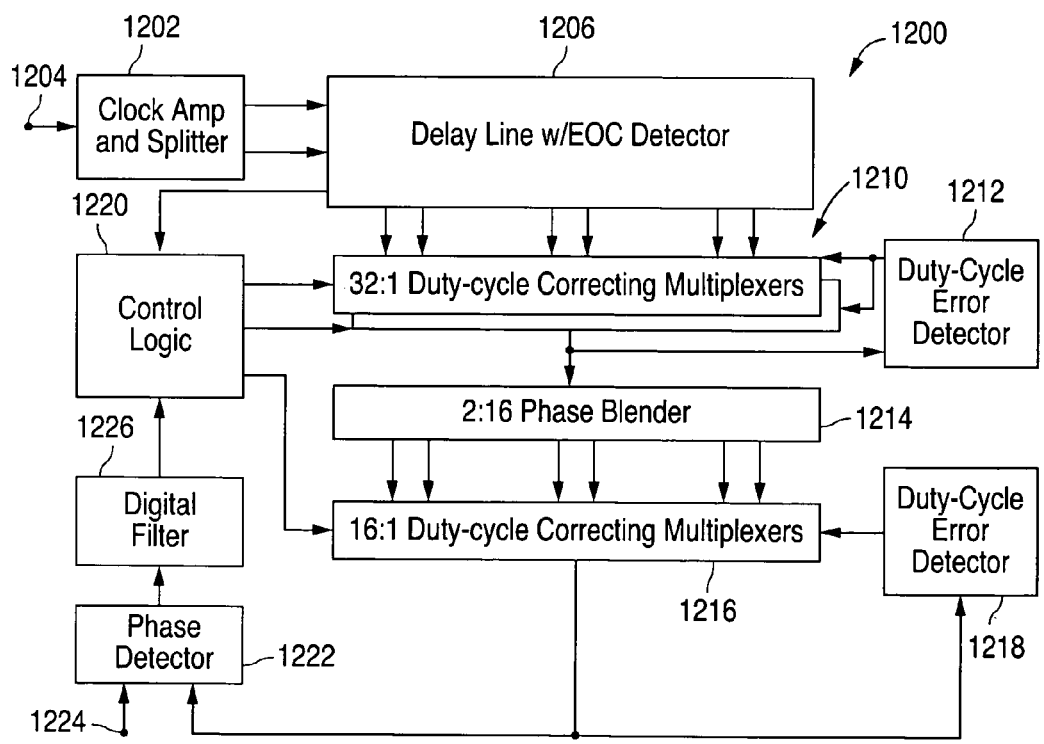
FIG. 13 is a block diagram illustrating a digital delay lock loop that is operable to minimize power consumption in a mobile device using cooperative adaptive voltage and threshold scaling in accordance with one embodiment of the present invention.

FIG. 13 is a block diagram illustrating a digital delay lock loop 1200 that is operable to minimize power consumption in a mobile device, such as the mobile device 10, using cooperative adaptive voltage and threshold scaling in accordance with one embodiment of the present invention. The digital delay lock loop 1200 comprises a clock amplifier/splitter 1202 that is operable to receive an external clock signal 1204 and to generate outputs for a delay line 1206 with an end-of-counter detector.

The digital delay lock loop 1200 also comprises two 32:1 duty-cycle correcting multiplexers 1210 that are operable to receive outputs from the delay line 1206 and to generate outputs. A duty-cycle error detector 1212 is operable to receive the outputs from the multiplexers 1210 and to provide correcting signals to the multiplexers 1210. The digital delay lock loop 1200 also comprises a 2:16 phase blender 1214 that is operable to receive the outputs from the multiplexers 1210 and to generate phase-blended outputs.

The digital delay lock loop 1200 also comprises a 16:1 duty-cycle correcting multiplexer 1216 that is operable to receive the phase-blended outputs from the phase blender 1214 and to generate an output. A duty-cycle error detector 1218 is operable to receive the output from the multiplexer 1216 and to provide a correcting signal to the multiplexer 1216.

The digital delay lock loop 1200 also comprises control logic 1220 that is operable to allow the signals to be passed from the delay line 1206 to the multiplexers 1210, from the multiplexers 1210 to the phase blender 1214, and from the phase blender 1214 to the multiplexer 1216 at the appropriate times.

The digital delay lock loop 1200 also comprises a phase detector 1222 that is operable to receive the output from the multiplexer 1216, in addition to a reference clock signal 1224. The phase detector 1222 is operable to provide a signal to a digital filter 1226 based on the output from the multiplexer 1216 and the reference clock signal 1224. The digital filter 1226 is operable to filter the phase detector signal and provide the filtered signal to the control logic 1220.

Figure 14:
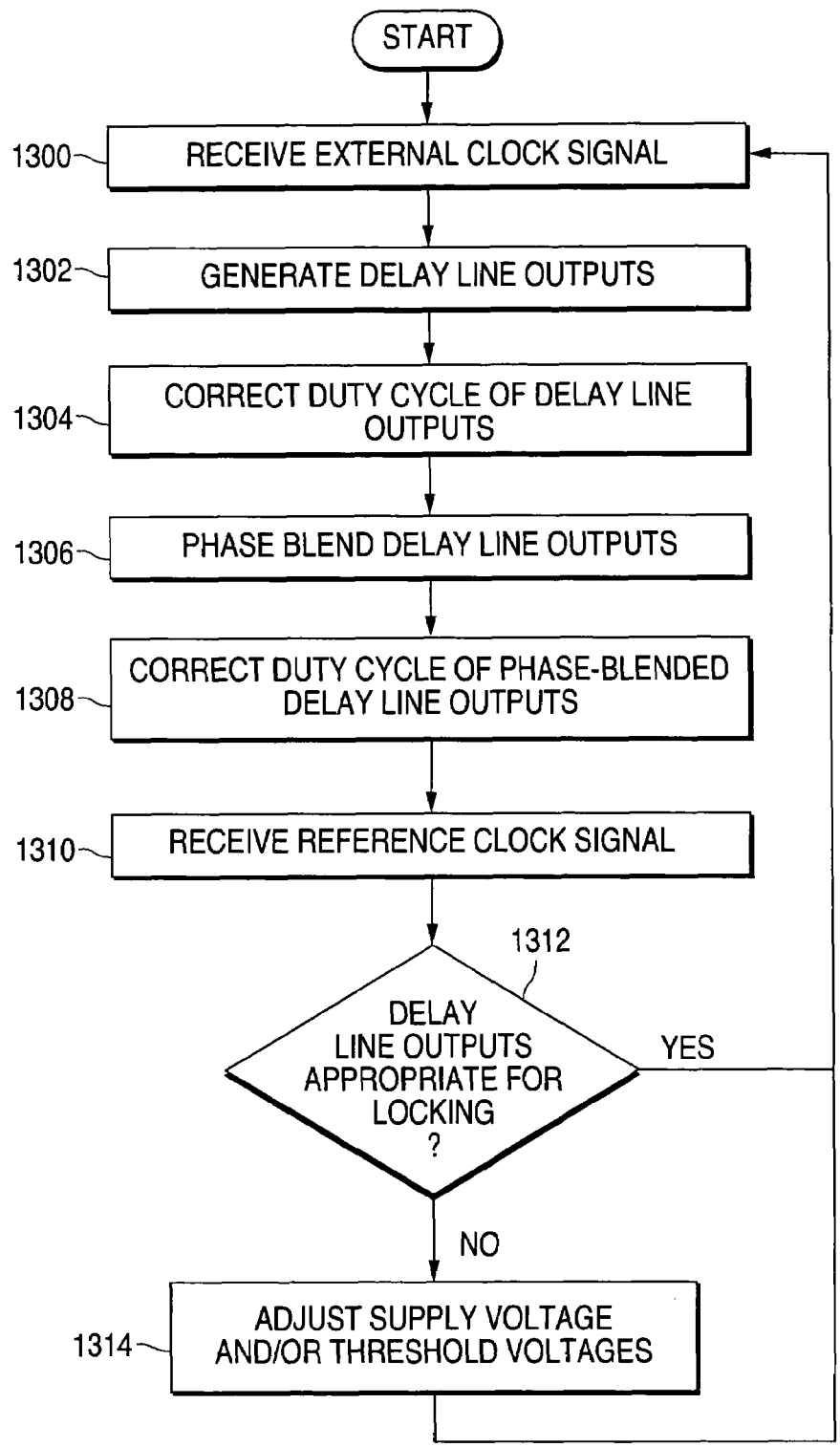
FIG. 14 is a flow diagram illustrating a method for using cooperative adaptive voltage and threshold scaling in the digital delay lock loop of FIG. 13 in accordance with one embodiment of the present invention.

FIG. 14 is a flow diagram illustrating a method for using cooperative adaptive voltage and threshold scaling in the digital delay lock loop 1200 in accordance with one embodiment of the present invention. The method begins at step 1300 where the clock amplifier/splitter 1202 receives the external clock signal 1204. At step 1302, the delay line 1206 generates delay line outputs based on the amplified clock signal from the clock amplifier/splitter 1202. At step 1304, the duty cycle of the delay line outputs are corrected by the multiplexers 1210.

At step 1306, the duty-cycle corrected delay line outputs are phase blended by the phase blender 1214. At step 1308, the duty cycle of the phase-blended delay line outputs are corrected by the multiplexer 1216. At step 1310, the phase detector 1222 receives the reference clock signal 1224, in addition to the duty-cycle corrected, phase-blended delay line outputs.

At decisional step 1312, a determination is made regarding whether the duty-cycle corrected, phase-blended delay line outputs are appropriate for locking to the correct frequency. If the delay line outputs are appropriate for locking to the correct frequency, the method follows the Yes branch from decisional step 1312 and returns to step 1300 to continue monitoring for any future adjustments to be made.

If the delay line outputs are not appropriate for locking to the correct frequency, the method follows the No branch from decisional step 1312 to step 1314. At step 1314, the supply voltage 34 and/or back bias voltages 36 and 38 are adjusted in order to shift the delay line outputs to the appropriate level for locking to the correct frequency. At this point, the method returns to step 1300 to continue monitoring for any future adjustments to be made.

Although the present invention has been described with several embodiments, various changes and modifications may be suggested to one skilled in the art. It is intended that the present invention encompass such changes and modifications as fall within the scope of the appended claims.

What is claimed is:

1. A method for minimizing power consumption in a mobile device using cooperative adaptive voltage and threshold scaling, comprising:
   receiving a supply voltage, a PMOS back bias voltage, and an NMOS back bias voltage;
   receiving a clock signal;
   propagating the clock signal through a timing comparison circuit;
   measuring a delay in the propagation of the clock signal through the timing comparison circuit;
   determining whether to request more power based on the measured delay of the propagation of the clock signal through the timing comparison circuit; and
   sending a voltage control signal to request more power when a determination is made to request more power based on the output of the timing comparison circuit, wherein the timing comparison circuit comprises (i) a plurality of inverters and a NOR gate, the NOR gate receiving an output from a final one of the inverters and an inverted clock signal, (ii) a register that comprises a first flip-flop generating a first status signal and a second flip-flop generating a second status signal; the register coupled to at least two delay cells, the register receiving output signals from the two delay cells; and (iii) a decoder that comprises a decoder inverter, the decoder inverter inverting the first status signal to generate a first power control signal, the decoder further providing the second status signal as a second power control signal, and wherein at least one of the first power control signal and the second power control signal are used to create the voltage control signal.

2. The method of claim 1, further comprising:
   determining whether to request less power based on the measured delay of the propagation of the clock signal through the timing comparison circuit when a determination is made not to request more power based on the output of the timing comparison circuit; and
   sending a voltage control signal to request less power when a determination is made to request less power based on the output of the timing comparison circuit.

3. The method of claim 2, the timing comparison circuit comprising one of a plurality delay cells and a replicated critical path.

4. The method of claim 2, further comprising:
   receiving a reference signal;
   determining the supply voltage, the PMOS back bias voltage, and the NMOS back bias voltage based on the voltage control signal and the reference signal; and
   generating the supply voltage, the PMOS back bias voltage, and the NMOS back bias voltage for the mobile device.

5. The method of claim 1, further comprising determining an operating mode for the mobile device based on the voltage control signal.

6. The method of claim 5, further comprising generating a switch signal to open a PMOS switch to uncouple the supply voltage from the PMOS back bias voltage and to open an NMOS switch to uncouple the NMOS back bias voltage from a ground potential when the operating mode for the mobile device comprises an open mode.

7. The method of claim 6, further comprising generating a switch signal to close the PMOS switch to couple the supply voltage to the PMOS back bias voltage and to close the NMOS switch to couple the NMOS back bias voltage to the ground potential when the operating mode for the mobile device comprises a closed mode.

8. The method of claim 1, further comprising providing the supply voltage, the PMOS back bias voltage and the NMOS back bias voltage to a processor for the mobile device.

9. A method for minimizing power consumption in a mobile device using cooperative adaptive voltage and threshold scaling, comprising:
   receiving a supply voltage, a PMOS back bias voltage and an NMOS back bias voltage from a power management unit at a processor;
   generating at the processor a voltage control signal based on a measured propagation delay through a timing comparison circuit of a clock frequency for a processor clock, the clock frequency based on the supply voltage, the PMOS back bias voltage and the NMOS back bias voltage, wherein the timing comparison circuit comprises (i) a plurality of inverters and a NOR gate, the NOR gate receiving an output from a final one of the inverters and an inverted clock signal, (ii) a register that comprises a first flip-flop generating a first status signal and a second flip-flop generating a second status signal, the register coupled to at least two delay cells, the register receiving output signals from the two delay cells; and (iii) a decoder that comprises a decoder inverter, the decoder inverter inverting the first status signal to generate a first power control signal, the decoder further providing the second status signal as a second power control signal, wherein at least one of the first and second power control signal are used to create the voltage control signal; providing the voltage control signal from the processor to the power management unit; receiving the voltage control signal from the processor at the power management unit; generating at the power management unit the supply voltage, the PMOS back bias voltage and the NMOS back bias voltage based on the voltage control signal; and providing the supply voltage, the PMOS back bias voltage and the NMOS back bias voltage from the power management unit to the processor.

10. A system for minimizing power consumption in a mobile device using cooperative adaptive voltage and threshold scaling, comprising:
    a timing comparison circuit:
    receiving a supply voltage, a PMOS back bias voltage, an NMOS back bias voltage, and a clock signal;

propagating the clock signal through the timing comparison circuit; and
measuring a delay in the propagation of the clock signal through the timing comparison circuit; and
a power control circuit:
determining whether to request more power based on the measured delay of the propagation of the clock signal through the timing comparison circuit; and
sending a voltage control signal to request more power when a determination is made to request more power based on the output of the timing comparison circuit;
wherein the timing comparison circuit comprises (i) a plurality of inverters and a NOR gate, the NOR gate receiving an output from a final one of the inverters and an inverted clock signal, (ii) a register that comprises a first flip-flop generating a first status signal and a second flip-flop generating a second status signal, the register coupled to at least two delay cells, the register receiving output signals from the two delay cells; and (iii) a decoder that comprises a decoder inverter, the decoder inverter inverting the first status signal to generate a first power control signal, the decoder further providing the second status signal as a second power control signal, wherein at least one of the first and second power control signal are used to create the voltage control signal.

11. The system of claim 10, wherein the power control circuit is further capable of:
determining whether to request less power based on the measured delay of the propagation of the clock signal through the timing comparison circuit; and
sending a voltage control signal to request less power when a determination is made to request less power based on the output of the timing comparison circuit.

12. The system of claim 10, wherein the timing comparison circuit comprises a plurality of delay cells.

13. The system of claim 10, wherein the power control circuit comprises:
a capacitor;
a power up current source capable of being coupled to the capacitor through a first switch and pumping up the capacitor when the first switch is closed, the first switch capable of being opened and closed based on a first power control signal from the timing comparison circuit; and
a power down current source capable of being coupled to the capacitor through a second switch and pulling down the capacitor when the second switch is closed, the second switch capable of being opened and closed based on a second power control signal from the timing comparison circuit.

14. The system of claim 10, further comprising a power management unit capable of receiving the voltage control signal from the power control circuit and generating the supply voltage, the PMOS back bias voltage, and the NMOS back bias voltage based on the voltage control signal.

15. The system of claim 14, wherein the power management unit comprises:
a controller capable of:
receiving the voltage control signal and a reference signal;
determining the supply voltage, the PMOS back bias voltage, and the NMOS back bias voltage based on the voltage control signal and the reference signal; and
generating a plurality of voltage reference signals; and
a plurality of voltage scalers capable of generating the supply voltage, the PMOS back bias voltage, and the NMOS back bias voltage based on the plurality of voltage reference signals.

16. The system of claim 14, wherein the power management unit is capable of providing more power by adjusting at least one of: the supply voltage, the PMOS back bias voltage, and the NMOS back bias voltage.

17. A system for minimizing power consumption in a mobile device using cooperative adaptive voltage and threshold scaling, comprising:
a processor:
receiving a supply voltage, a PMOS back bias voltage, and an NMOS back bias voltage; and
generating a voltage control signal based on a measured propagation delay through a timing comparison circuit of a clock frequency for a processor clock, the clock frequency based on the supply voltage, the PMOS back bias voltage, and the NMOS back bias voltage, wherein the timing comparison circuit comprises (i) a plurality of inverters and a NOR gate, the NOR gate receiving an output from a final one of the inverters and an inverted clock signal, (ii) a register that comprises a first flip-flop generating a first status signal and a second flip-flop generating a second status signal, the register coupled to at least two delay cells, the register receiving output signals from the two delay cells; and (iii) a decoder that comprises a decoder inverter, the decoder inverter inverting the first status signal to generate a first power control signal, the decoder further providing the second status signal as a second power control signal, wherein at least one of the first and second power control signal are used to create the voltage control signal and
a power management unit:
receiving the voltage control signal from the processor;
generating the supply voltage, the PMOS back bias voltage, and the NMOS back bias voltage based on the voltage control signal; and
providing the supply voltage, the PMOS back bias voltage, and the NMOS back bias voltage to the processor.

18. The system of claim 17, wherein the power management unit is capable of providing more power by adjusting at least one of: the supply voltage, the PMOS back bias voltage, and the NMOS back bias voltage.

* * * * *

UNITED STATES PATENT AND TRADEMARK OFFICE
CERTIFICATE OF CORRECTION

| | | |
|---|---|---|
| PATENT NO. | : 7,493,149 B1 | Page 1 of 1 |
| APPLICATION NO. | : 10/106428 | |
| DATED | : February 17, 2009 | |
| INVENTOR(S) | : James T. Doyle et al. | |

It is certified that error appears in the above-identified patent and that said Letters Patent is hereby corrected as shown below:

Column 4, line 53, insert --20-- after the term "clock".

Signed and Sealed this

Fifth Day of January, 2010

David J. Kappos
*Director of the United States Patent and Trademark Office*